United States Patent [19]

Hoeppner

[11] 4,135,301

[45] Jan. 23, 1979

[54] MOTORIZED CHAIN SAW

[75] Inventor: Klaus Hoeppner, Marbach, Fed. Rep. of Germany

[73] Assignee: Firma Andreas Stihl, Waiblingen, Fed. Rep. of Germany

[21] Appl. No.: 801,303

[22] Filed: May 27, 1977

[30] Foreign Application Priority Data

May 28, 1976 [DE] Fed. Rep. of Germany ....... 2623826

[51] Int. Cl.² .......................... B27B 17/00; F16F 1/36
[52] U.S. Cl. ........................................ 30/381; 267/137
[58] Field of Search ................ 30/381, 382, 383, 384, 30/385, 386; 267/137; 173/162

[56] References Cited

U.S. PATENT DOCUMENTS

| 3,651,839 | 3/1972 | Stihl | 30/381 |
|---|---|---|---|
| 3,690,640 | 9/1972 | Pineau | 267/137 |
| 3,728,793 | 4/1973 | Makinson | 30/383 |
| 3,733,700 | 5/1973 | Notards | 30/381 |

*Primary Examiner*—Jimmy C. Peters
*Attorney, Agent, or Firm*—Richard L. Schwaab

[57] ABSTRACT

Disclosed is a motorized chain saw, comprising: a handle-housing member including at least one handle for carrying the saw; at least one crankcase member; and at least one means including a vibration-damping elastic member for providing a shock absorbing connection between the housing member and the crankcase member. The elastic member is laterally expandable and includes at least one axial expansion opening for accepting a selectively insertable means for expanding the rubber elastic member.

24 Claims, 5 Drawing Figures

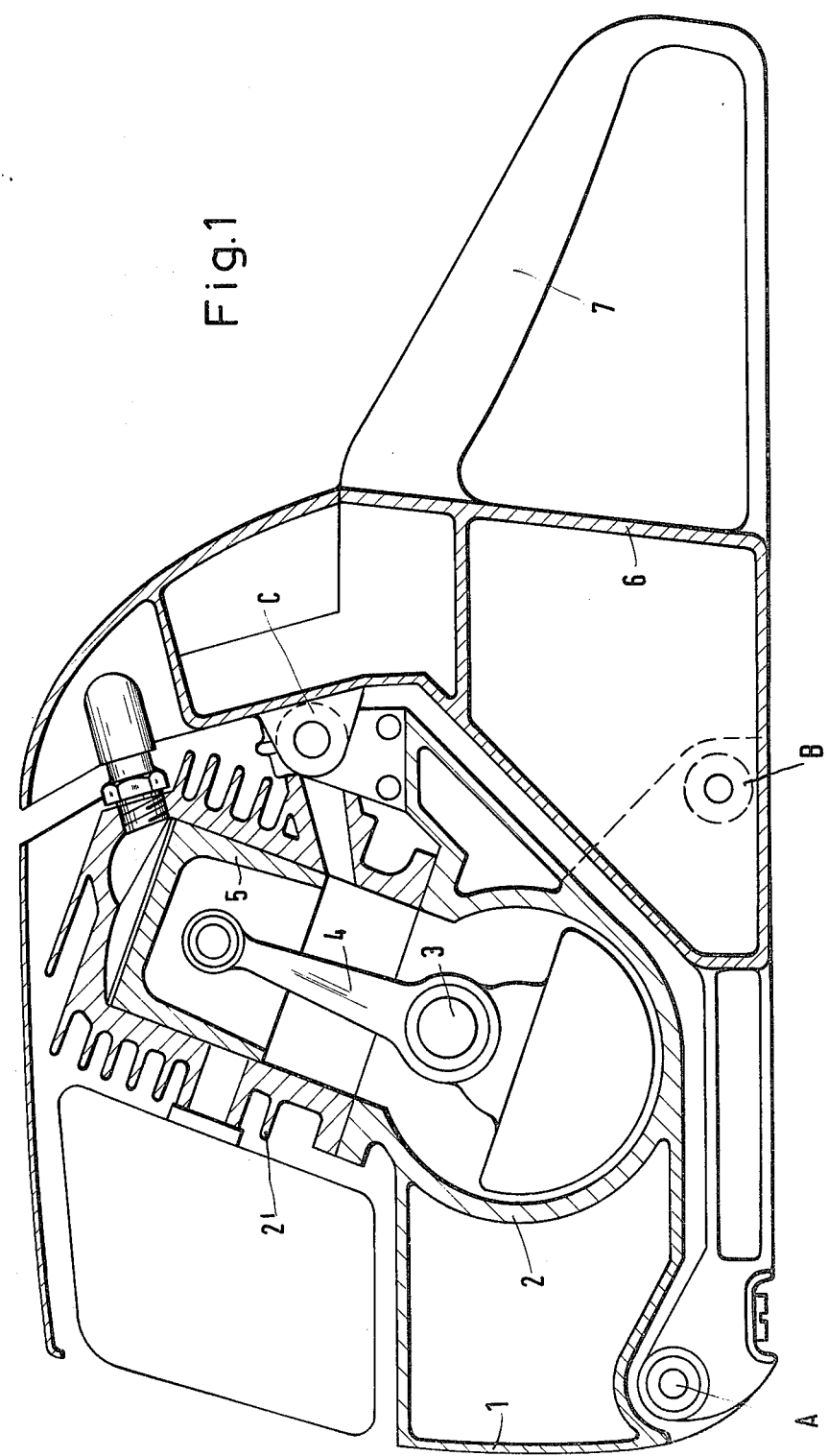

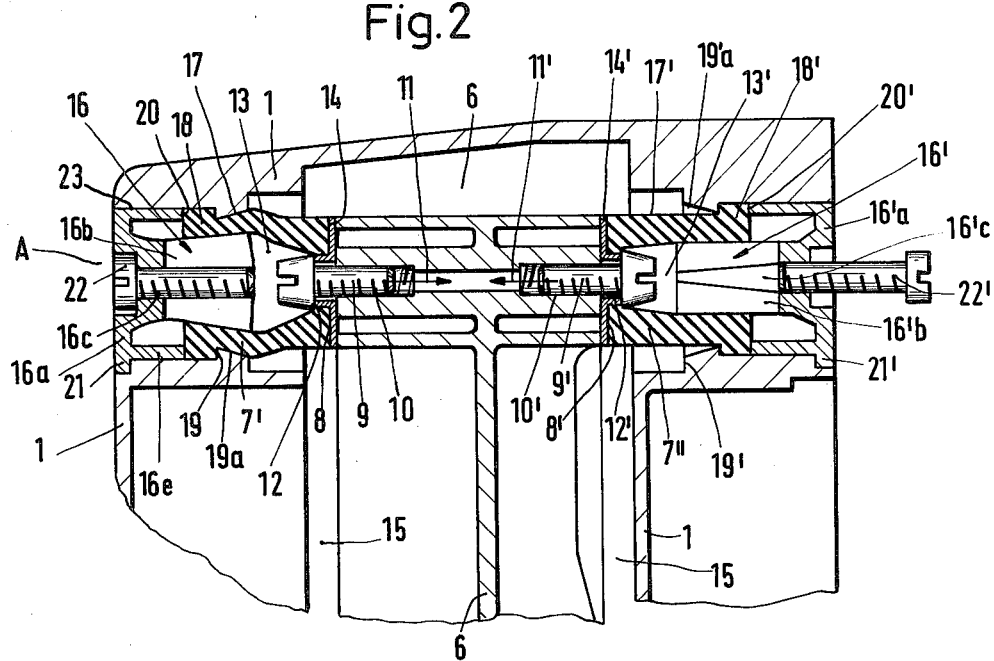
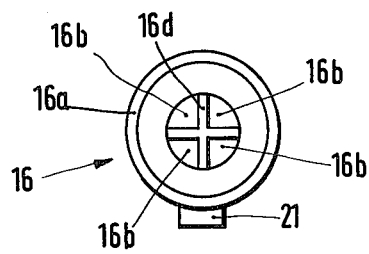
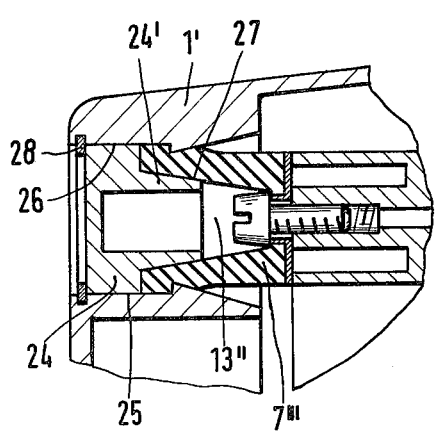
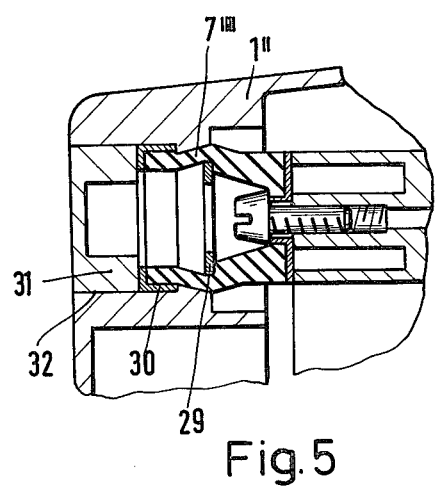

MOTORIZED CHAIN SAW

BACKGROUND OF THE INVENTION

The present invention relates to a motorized chain saw having a handle-housing component which includes one or more carrying handles and having at least one crankcase component, which is connected to the handle-housing component through at least one vibration damping rubber-elastic shock absorber.

In one of the known configurations, the rubber-elastic shock absorbers which are provided for vibration damping, also called vibrations mount elements, are arranged within the motor housing which is designed in the form of several parts. In this case, the housing of the motorized chain saw is thus divided, in the longitudinal direction of the saw, i.e., in the direction of the saw bar, into a handle-housing component, which is located in the middle of the housing, and two crankcase components, which are located on the sides of this handle-housing component. These components are connected to each other by means of rubber-elastic elements (shock absorbers) which are integrated into the housing. These rubber-elastic shock absorbers are attached in the housing as widely spaced apart from each other as possible, and are made of relatively soft rubber, in order to obtain a good damping. Additionally, they are rigidly clamped into the housing, so that they can be loaded in all directions. Because these shock absorbers are subjected to a relatively intense continuous load, they must be replaced from time to time. It must be possible to carry out this replacement at the work site, thus in the woods or at the building site, and so forth, without special tools and without the necessity of completely disassembling the chain saw. In the known embodiments, a simple replacement of the rubber-elastic shock absorbers at the work site and by the user of the saw is not readily possible.

SUMMARY OF THE INVENTION

It is therefore an object of the invention to provide an improved chain saw design.

It is another object of this invention to provide a motorized chain saw of the initially described type wherein the vibration damping rubber-elastic shock absorbers can be replaced at the working site, when necessary, i.e., in the woods or at the building site, and so forth.

Another object of the invention resides in providing an improved chain saw design wherein the user, can readily replace the rubber-elastic shock absorbing elements, without special tools and without the necessity for disassembling the saw housing.

It is still another object of this invention to provide an improved elastic shock absorbing member for joining together two parts of a device, such as a chain saw.

In accomplishing the foregoing objects, there has been provided according to the present invention a motorized chain saw, comprising: a handle-housing member including at least one handle for carrying the saw; at least one crankcase member; and at least one means including a vibration-damping elastic member for providing a shock absorbing connection between the housing member and the crankcase member. The elastic member is laterally expandable and includes at least one axial expansion opening for accepting a selectively insertable means for expanding the rubber elastic member.

The electric member preferably includes means for seating a fastening member such as a screw and the expansion opening is positioned at least approximately coaxially with respect to the fastening member. Preferably, the elastic member is cylindrical shaped, the inside cross-section of the expansion opening conically converges in the direction toward the seating means, and the elastic member further comprises a radially extending collar defining an annular support surface adapted for engagement with the crankcase member and an opposing, parallel support surface adapted for engagement with a closure member.

According to one feature of the invention, the fastening means comprises a cap screw having a head which is longer than the distance separating the handle-housing member and the crankcase member.

In one embodiment, the expanding means comprises a deformable expansion member and means including a threaded bolt for deforming the expansion member.

In another embodiment, the expanding means comprises an insertable closure member, and in yet another embodiment, the expanding means comprises a resilient ring member.

Further objects, features, and advantages of the invention will become apparent from the following detailed description of preferred embodiments when considered together with the attached figures of drawings.

BRIEF DESCRIPTION OF THE DRAWINGS

In the drawings:

FIG. 1 is a longitudinal cross sectional view through a motorized chain saw;

FIG. 2 is a cross sectional view through the elastic fastening between crankcase component and handle-housing component at the fastening point A of FIG. 1, whereby the left portion of the drawing shows the rubber-elastic connection in the installed, i.e., the expanded condition, and the right portion shows the connection inserted into the housing, but not expanded;

FIG. 3 is a rear view on an expansion pin, used in FIG. 2, taken opposite to the direction of insertion in the housing bore; and FIGS. 4 and 5 show additional embodiments of expansion means.

DETAILED DESCRIPTION OF PREFERRED EMBODIMENTS

In accordance with this invention, a motorized chain saw is provided of the initially described type in which the vibration damping shock absorber is configured so as to be capable of being expanded across its clamping direction and is provided with at least one expansion opening for accepting insertable and removable spreading means.

In FIG. 1, the crankcase component is designated as 1, and in it, the crankcase 2 with cylinder 2', crankshaft 3, connecting rod 4, and piston 5 are supported. As shown in FIG. 2, this crankcase component is arranged along the two longitudinal sides of a middle housing component 6, the so-called handle-housing component. The rear handle 7, as well as the front handle, which is generally of a bow-shaped or inverted U-shaped configuration, and which is not illustrated in greater detail in the drawing, are arranged on this handle-housing component. In the illustrated embodiment, the handle-housing component 6 and the crankcase component 1 are connected to each other at three points A, B, C (FIG. 1). In order to adequately damp the vibrations emanating from the motor unit, in their transition at the connecting point of crankcase component 1 to handle-housing component 6, rubber elastic shock absorbers 7',7" are arranged at the two connecting points between housing components 1 and 6, i.e., on opposing sides of the saw, as shown for example in FIG. 2 for point A. The shock absorbers abut by means of their faces 8,8', which are toward the handle-housing component, with the plane-parallel faces of the handle-housing component 6, and are tightly pressed against this housing component 6 in the clamping direction (see arrows 11,11') by means of fastening screws 9,9', which are screwed into threads 10,10' of the handle-housing component 6.

Fastening screws 9,9' are configured as cap screws, preferably as socket head cap screws. The bearing surfaces of these socket head cap screws 9,9' each contact a seat 12,12', which is formed at the clamping end of each shock absorber 7',7" by means of a convergence of the interior cross-section of the expansion openings of the two shock absorbers. The faces 8,8' of the two shock absorbers 7,7' can be provided with a metallic overlay 14,14', which is vulcanized to the face of the shock absorber 7,7', as in the case of a so-called vibration dampening element. In the illustrated embodiment, the metal face overlay 14,14' has an axial shoulder, which reaches to the inner contact surface of the socket head cap screw and which reinforces seats 12,12' for the socket head cap screws.

In accordance with a special feature of the invention, the height of the head of fastening screws 9,9' including the thickness of the metallic overlay 14,14', is greater than the gap 15,15' between crankcase component 1 and handle-housing component 6, so that, in case of a fracture of the rubber-elastic shock absorber 7',7", the housing components 1, 6 will not fall apart. In order to make it possible to carry out a simple replacement of weakened or destroyed shock absorbers 7',7" at the working site and without the use of special tools, each vibration dampening shock absorber 7',7" is constructed with an expandable configuration transverse to its clamping direction 11,11', and is provided with at least one expansion opening 13,13' for accepting insertable and removable expansion means.

In the embodiment of FIGS. 2 and 3, there is provided as the expansion means an expansion pin, preferably consisting of plastic, fitting into the expansion opening 13, respectively 13' of the shock absorbers 7',7". This expansion pin 16,16' is pushed into the expansion opening 13,13', which is arranged at least approximately coaxially and centrally with the fastening screw 9,9'. The outer circumferential surface 17, or 17' of each shock absorber is preferably configured cylindrically prior to its clamping and, as shown in FIG. 2, is provided with a radially projecting collar 18,18'. Each collar 18,18' evidences an inner radial support surface 19,19', by means of which it lies in the expanded condition against this radial counter-support surface in the crankcase in the direction of the clamping (arrows 11,11'). Toward the free end of shock absorber 7',7", there is a surface 20,20' parallel to the support surface 19,19', against which lies the free inserted end of the expansion pin 16,16', which is configured as a closure plug.

Shock absorber 7',7" can also comprise other forms, deviating from the cylindrical form. The significant fact is only that, on the one hand, the shock absorber is clamped with fastening screws 9,9' against the handle-housing component 6, and, with its non-clamped other segment is pressed, with deformation, by means of any likewise discretionally configured expansion means, against the inside wall of the crankcase component 1 in such a manner that it adapts to the shape of the inside wall of the crankcase component and forms a positive and/or force-locking connection with it, so that vibrations of the crankcase component 1 pass into the handle-housing component 6 exclusively through the rubber-elastic shock absorber 7',7".

However, it has been shown that an advantageous embodiment of the shock absorber is provided when, viewed in a section across the clamping direction 11,11', the outer circumference lines and/or the inner circumference lines of the expansion opening 13,13' have a circular configuration, as illustrated in the right portion of FIG. 2 for the shock absorber 7" which is not yet deformed by expansion.

To attain a greater stability in the clamping area, the interior cross-section of the expansion opening 13,13' has a tapered configuration in the direction toward the support 12,12', for receiving the fastening screw 9,9', so that the cross-sectional thickness of the rubber material constantly increases in the direction of these supports 12,12'. In this manner, the goal is attained that the section of the shock absorber with which the expansion means (e.g., the expansion pin 16,16') acts, has a sufficient elastic deformability, while the actual support points 12,12' themselves have a sufficient stability.

The expansion pin 16,16' can be provided with a protection means against torsion in the form of a projection 21,21' (FIG. 3). This torsion projection 21,21' engages in a corresponding recess of the crankcase component and thus prevents a rotating motion of the expansion pin.

The expansion pin 16,16' in accordance with FIGS. 2 and 3 evidences a head 16a,16'a, which is joined by expansion webs 16b,16'b. A central recess 16c,16'c passes through expansion head 16a and the adjoining expansion webs 16b (16'a and 16'b). The central recess preferably has a conically tapered configuration in the clamping direction 11,11'. The expansion bolt, preferably a screw 22,22', is screwed into the opening 16c,16'c, whereby the expansion webs 16b,16'b are radially expanded and lie against the inner wall of the expansion opening 13,13' and, in this manner, press the deformable part of shock absorber 7',7" apart until its outer wall is rigidly pressed against the correspondingly configured inner wall of the crankcase component. Expansion webs 16b are formed in a simple manner by axial slits 16d, or slit-like recesses in the web portion 16b which adjoins the head portion 16a. In addition, an annular rim 16e is provided on head 16a of expansion pin 16. The outside diameter of this annular rim corresponds to the inside diameter of the insertion bore 23 of crankcase component 1, so that the expansion pin, after it has been inserted axially, seats without clearance in the insertion bore 23 and the free end of rim 16e lies against the counter-contact surface 20 on the face of the shock absorber 7'.

In the embodiment illustrated in FIG. 2, the rubber-elastic shock absorber 7" in the right hand portion of FIG. 2, is clamped against the handle-housing component 6 by means of cap screw 9'. Expansion pin 16' is pushed into the expansion opening 13' of shock absorber 7", so that the outside surfaces of the expansion webs 16'b lie against the inside wall of the expansion opening 13'. If expansion screw 22' is axially screwed into the conical recess 16'c of expansion pin 16', webs 16'b expand radially and press the axial segment of shock absorber 7" radially and under elastic deformation against the inside surface of crankcase component 1, which is provided with the inclined surface 19'a. Following the final expansion, thus after expansion screw 22 has been screwed in, referring now to the left hand portion of FIG. 2, webs 16b assume the expanded position shown in the left hand portion of FIG. 2. The webs have thereby deformed the deformable segment of the rubber-elastic shock absorber in the manner also shown in the left hand portion of FIG. 2, so that the outer circumferential surface 17 of shock absorber 7' is clamped against the inclined surface 19a in the crankcase 1, and the collar 18 is pressed, with its radial contact surface 19', against the corresponding annular contact surface in housing 1.

FIG. 4 shows another embodiment of the invention. Here, a preferably plastic closure cap 24 is inserted into expansion opening 13" as the expansion means. The closure cap 24 has a circumferential surface 26 corresponding to opening 25 of the crankcase component 1', and further has a transition of that surface into a preferably conically configured inclined surface 27, which lies against the wall of the expansion opening 25. Closure cap 24 thus evidences, at its front section, a conical rim 24'. Upon the axial insertion of cap 24 into expansion opening 13" the conical rim spreads the walls of the rubber-elastic shock absorber 7'" radially against the correspondingly configured inner walls of the crankcase component 1' and, in the inserted position, firmly presses them against this crankcase housing wall. In this inserted position of the cap 24, it is secured in its expanding position in the axial direction by a snap ring 28, which is inserted into an annular recess of the crankcase housing 1'.

In the embodiment of FIG. 5, a resilient ring 29 is provided as the expansion means. The ring radially expands the deformable segment of the rubber-elastic shock absorber and presses it against the above-described inner surface of the crankcase housing 1". A corresponding recess can be provided on the inside wall of shock absorber 7" in order to positionally secure this resilient ring 29. In addition, for the purpose of a better absorption of the operating forces, a metal ring 30, preferably in the form of an angle ring, is provided on the free end of the shock absorber 7"", opposite the expanding end. This angle ring can also be vulcanized on the face or the axial end section of shock absorber 7"". In this case, a plug 31, which is inserted in housing bore 32 and acts as a dust protector, is provided on the insertion side, thus on the free end face of the shock absorber 7"".

By means of this invention, a simple fastening for the rubber shock absorbers is provided which, without the necessity for special tools or without the necessity for the disassembly of the motorized chain saw, can be inserted and replaced at any time. For this purpose, it is necessary only to insert the rubber shock absorber in the opening of the crankcase component and to screw in screw 9, or 9', by which the rubber shock absorber is firmly clamped against the faces of the handle-housing component 6. Then, also without special tools, the expansion element, for example, an expansion pin 16 in accordance with FIGS. 2, 3 is inserted into the expansion opening of the rubber shock absorber. After the insertion of the expansion pin, it is necessary to simply axially introduce an expansion bolt, for example, an expansion screw 22, which spreads the rubber shock absorber radially in such a manner that it lies against the inner wall of the crankcase component with firm positive and/or frictional connection. In the case of the embodiment of FIG. 5, it is also necessary to merely insert the closing cap, which is provided with a conical rim; and the cap is positionally secured by the insertion of a snap ring. Also, the arrangement of a resilient expansion ring 29 in accordance with the embodiment of FIG. 5 is most simple, because this resilient ring need only be pressed into the expansion opening of the rubber shock absorber 7"". After the expansion of the rubber shock absorber 7"", cap 31 is pressed into bore 32 as a means of dust protection.

The shock absorber which is configured in accordance with this invention can be stressed by pressure, tension and/or torsion. It is readily possible to configure the contacts which are provided for the shock absorber in such a manner that the shock absorber has a progressive force of compression. The configuration in accordance with this invention also makes possible a considerable relative spacing of the individual rubber elastic shock absorbers with respect to each other, so that a good lateral guidance and damping of the machine is assured. Finally, the configuration in accordance with this invention saves space, is simple in its construction, and is thus also suitable for mass production. In addition to the expansion function itself, the expansion elements have simultaneously a sealing function and thus prevent fouling of the fastening points. As a result of the special dimensioning of the heads of the fastening screws, it is simultaneously prevented that the individual housing components could fall apart in the case of damaged or broken rubber-elastic shock absorbers.

What is claimed is:

1. A motorized chain saw, comprising a centrally located handle-housing member including at least one handle for carrying the saw; at least one crankcase member positioned laterally externally of said handle-housing member and having an aperture therethrough; and at least one means for providing a shock absorbing connection between the handle-housing member and the crankcase member, said connection means including a vibration-damping elastic member passing through said aperture, said elastic member including at least one centrally positioned axially extending expansion opening surrounded by side walls of said elastic member which are laterally expandable against the inside surface of said aperture, said expansion opening being open on the end of said elastic member facing away from said handle-housing member and being generally closed to form an abutment end wall on the end facing said handle-housing member, said connection means further comprising a first fastening member insertable through said open end for fastening said abutment end to said handle-housing member, and a second expansion means selectively insertable into said open end for outwardly expanding the side walls of said elastic member into tight engagement with the inside surface of said aperture, whereby said elastic member may be replaced by a new elastic member from the outside of the saw without disassembling said saw.

2. The motorized chain saw as defined by claim 1, wherein said elastic member includes means in said abutment end wall for seating said fastening member and wherein said expansion opening is positioned at least approximately coaxially with respect to the fastening member.

3. The motorized chain saw as defined by claim 2, wherein the fastening member is a screw having its head seated in said seating means and its threaded portion held by said handle-housing member.

4. The motorized chain saw as defined by claim 2, wherein the cross-sectional thickness of the side walls of the elastic member is at least approximately equal.

5. The motorized chain saw as defined by claim 1, wherein the lateral cross-section of at least one of the elastic member circumference or the inner circumference of said expansion opening is at least approximately circular.

6. The motorized chain saw as defined by claim 5, wherein the elastic member is cylindrical shaped and further comprises a radially extending collar defining an annular support surface adapted for engagement with the crankcase member and an opposing, parallel support surface adapted for engagement with a closure member.

7. The motorized chain saw as defined by claim 6 wherein the inside cross-section of said expansion opening conically converges in the direction toward said seating means for a fastening member.

8. The motorized chain saw as defined by claim 7, wherein said seating means comprises a constriction of the inside cross-section of said expansion opening.

9. The motorized chain saw as defined by claim 8, wherein said fastening means comprises a cap screw having a head which is longer than the distance separating the handle-housing member and the crankcase member.

10. The motorized chain saw as defined by claim 9, wherein said cap screw is a socket head cap screw.

11. The motorized chain saw as defined by claim 9, wherein said elastic member includes a metallic overlay on its end surface facing the handle-housing member, and wherein the length of the screw head plus the thickness of the metallic overlay are greater than the distance separating the handle-housing member and the crankcase member.

12. The motorized chain saw as defined by claim 7, wherein the aperture in said crankcase member includes an inclined inside surface adapted to the outer surface of said elastic member in its expanded condition.

13. The motorized chain saw as defined by claim 12, wherein said expanding means comprises an insertable closure member.

14. The motorized chain saw as defined by claim 13, wherein said closure member comprises a first portion having an outer diameter corresponding to the inside diameter of said crankcase member aperture and a second portion having a converging cross-section for engaging with the walls of said conically converging expansion opening.

15. The motorized chain saw as defined by claim 14, wherein said expanding means further comprises a snap ring member for securing said closure member in said crankcase member aperture.

16. The motorized chain saw as defined by claim 12, wherein said expanding means comprises a resilient ring member.

17. The motorized chain saw as defined by claim 16, wherein said elastic member further comprises a metallic ring secured to the end facing said crankcase member.

18. The motorized chain saw as defined by claim 17, wherein said metallic ring comprises an angle ring vulcanized to said elastic member.

19. The motorized chain saw as defined by claim 17, further comprising a closure member inserted into said crankcase member aperture in abuttment with said metallic ring.

20. The motorized chain saw as defined by claim 1, wherein said expanding means comprises a deformable expansion member and means including a threaded bolt for deforming said expansion member.

21. The motorized chain saw as defined by claim 20, wherein said expansion member includes a threaded recess for receiving said threaded bolt.

22. The motorized chain saw as defined by claim 21, wherein said expansion member includes a plurality of webs separated by axial slits and wherein said threaded recess is conically tapered.

23. The motorized chain saw as defined by claim 6, wherein said expanding means includes an annular rim having an outer diameter corresponding to the inside diameter of said crankcase member aperture and having a front surface adapted to abut against said opposing parallel support surface of said elastic member collar, whereby said annular rim acts as a closure member.

24. The motorized chain saw as defined by claim 1, wherein said expanding means further includes means including a radial projection for preventing rotation thereof.

* * * * *